United States Patent
Ebisawa et al.

(10) Patent No.: US 6,816,624 B1
(45) Date of Patent: Nov. 9, 2004

(54) METHOD AND APPARATUS FOR CORRECTING DEGRADATION OF BOOK CENTER IMAGE BY IMAGE PROCESSING BASED ON CONTOUR OF BOOK CENTER IMAGE

(75) Inventors: Takashi Ebisawa, Amimachi (JP); Bai Xuqiang, Amimachi (JP); Hiroyuki Watanabe, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/510,733

(22) Filed: Feb. 22, 2000

(30) Foreign Application Priority Data

Feb. 23, 1999 (JP) .......................................... 11/044965

(51) Int. Cl.[7] .............................. G06K 9/40; H04N 1/04
(52) U.S. Cl. ...................... 382/275; 382/293; 382/312; 358/496
(58) Field of Search ................................. 382/275, 274, 382/300, 269, 267, 266, 263, 289, 293, 295, 296, 305, 312, 317, 321; 358/296, 443, 474, 496, 497, 498, 448

(56) References Cited

U.S. PATENT DOCUMENTS

| | | | |
|---|---|---|---|
| 5,084,611 A | 1/1992 | Okisu et al. | 250/208.1 |
| 5,267,059 A * | 11/1993 | Kawabata et al. | 358/498 |
| 5,276,530 A * | 1/1994 | Siegel | 358/406 |
| 5,497,236 A * | 3/1996 | Wolff et al. | 358/296 |
| 5,585,926 A | 12/1996 | Fujii et al. | |
| 5,940,544 A * | 8/1999 | Nako | 382/293 |
| 5,973,792 A * | 10/1999 | Matsuda | 358/448 |
| 6,014,470 A * | 1/2000 | Matsuda | 382/275 |
| 6,256,411 B1 * | 7/2001 | Iida | 382/203 |
| 6,330,050 B1 | 12/2001 | Takahashi et al. | |

FOREIGN PATENT DOCUMENTS

| | | |
|---|---|---|
| DE | 197 36 696 A | 2/1998 |
| DE | 198 33 417 A1 | 1/1999 |
| JP | 62-143557 | 6/1987 |
| JP | 5-161002 | 6/1993 |

* cited by examiner

Primary Examiner—Kanji Patel
(74) Attorney, Agent, or Firm—Nixon Peabody LLP; Donald R. Studebaker

(57) ABSTRACT

An image processing apparatus corrects degradation of an image of a pair of spread pages of a bound book placed on a document table. The image processing apparatus includes a height obtaining unit which obtains a plurality of heights, above the document table, of a plurality of points of the pair of spread pages, based on a contour of the pair of spread pages which appears in the image, and an image correcting unit which corrects the degradation of the image based on the plurality of heights obtained by the height obtaining unit. The degradation may be unevenness of lightness, deformation, a blur, or the like.

5 Claims, 10 Drawing Sheets

F I G . 1
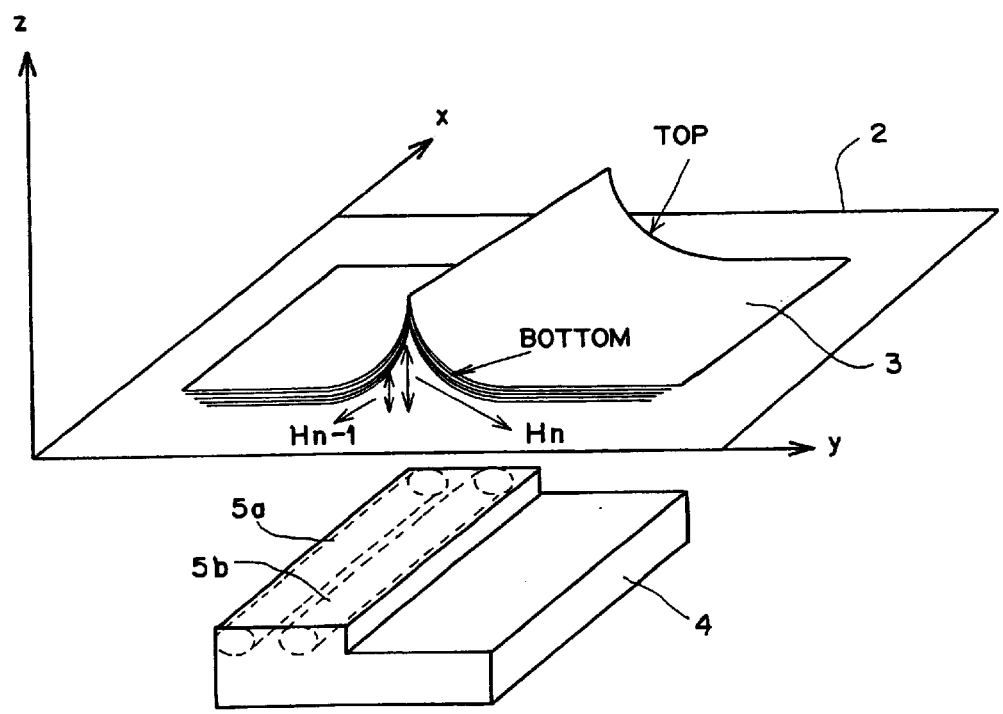
PRIOR ART

PRIOR ART

F I G. 4
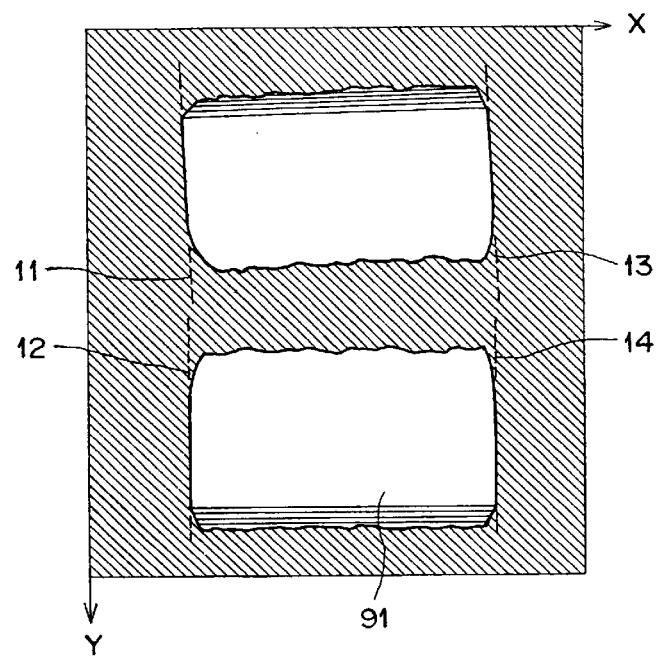
F I G. 5
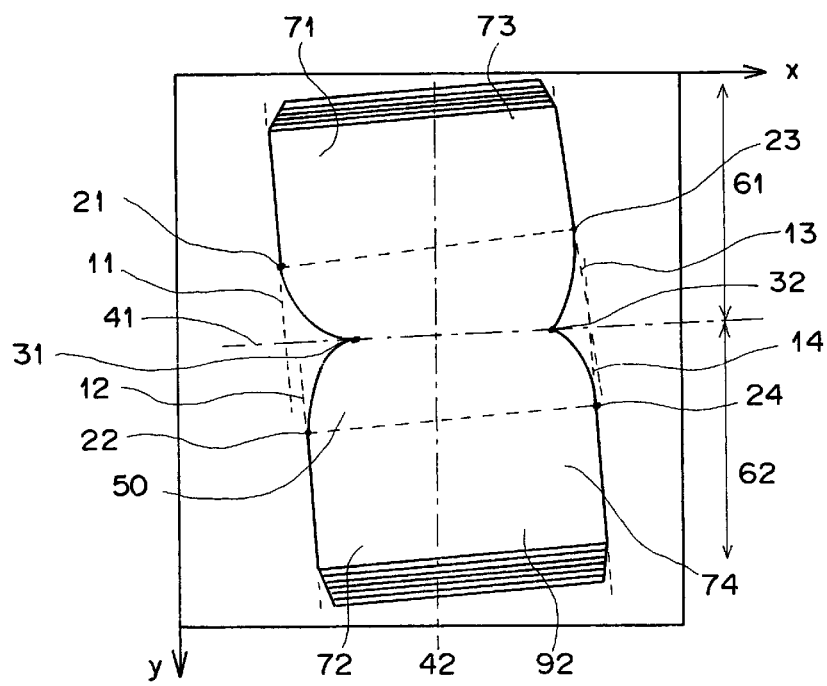

F I G. 6a  F I G. 6b
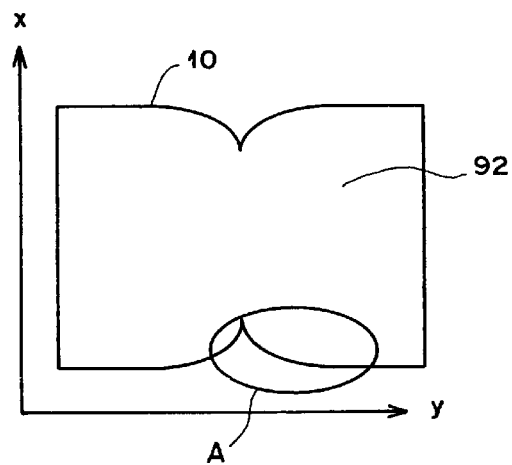
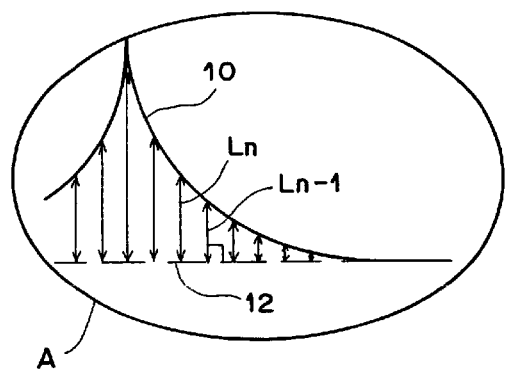

F I G . 11
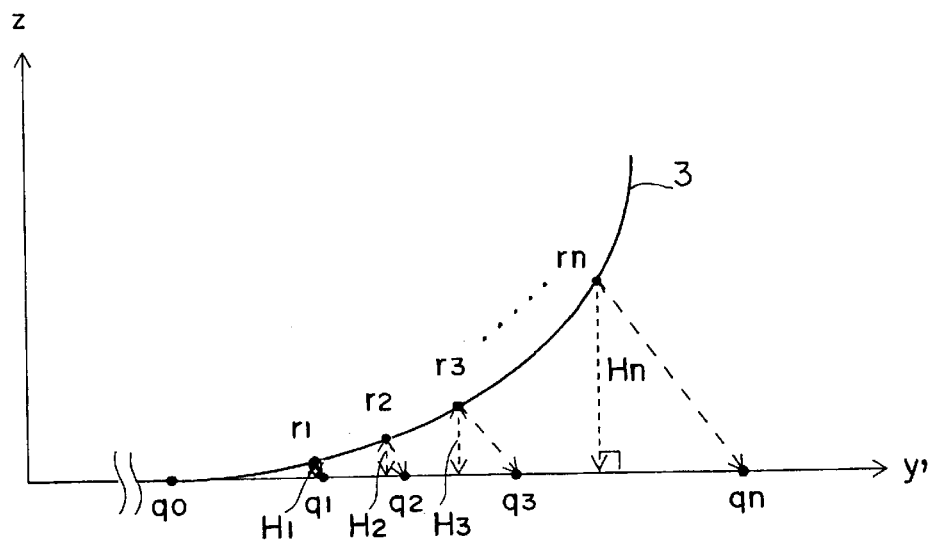
F I G . 12
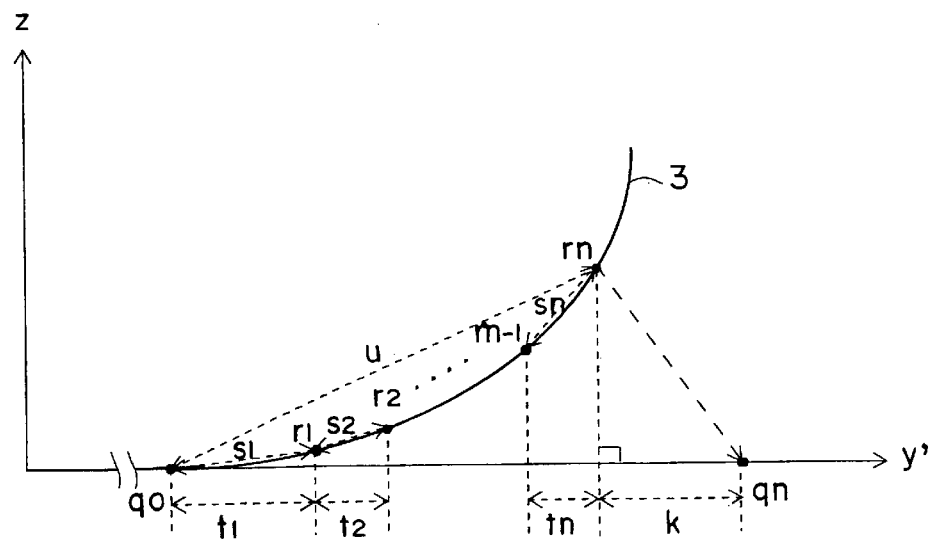

○ VACATED PIXEL
● UNVACATED PIXEL (EXISTING PIXEL)

F I G. 15
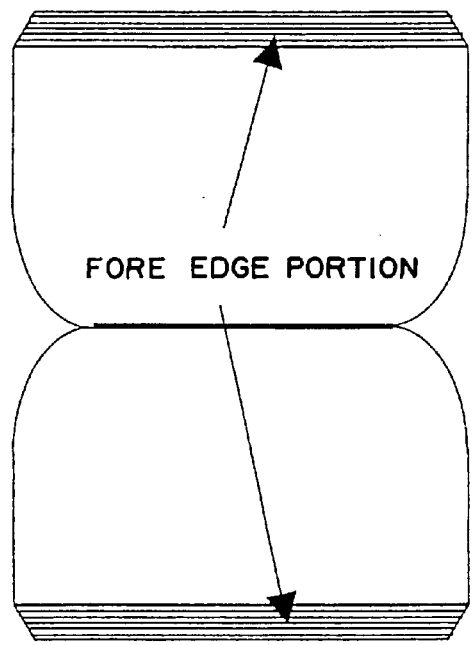
FORE EDGE PORTION

METHOD AND APPARATUS FOR CORRECTING DEGRADATION OF BOOK CENTER IMAGE BY IMAGE PROCESSING BASED ON CONTOUR OF BOOK CENTER IMAGE

BACKGROUND OF THE INVENTION

1. Field of the Invention

The present invention relates to an image processing method and an image processing apparatus for correcting unevenness of lightness, deformation, a blur, or the like, which occurs in an image of a center portion of a pair of spread (open) pages of a bound book (as an original document) when the spread pages of the book are read by a flat bed scanner (as an image reading apparatus) having a document table. The flat bed scanner is contained in general-purpose scanners, filing systems, copiers, facsimile machines, and various printing machines. In this specification, a center portion of a pair of spread pages of a bound book, i.e., a portion near the binding of a book, may be referred to as a book center.

2. Description of the Related Art

FIG. 1 is a perspective view illustrating relative positions of a document table, a book document, and an image reading apparatus. When a pair of spread (open) pages of a book document is read by a flat bed scanner, the book center, i.e., a portion near the binding of the book, is lifted from the document table. Therefore, the image of the book center is darkened, deformed, and blurred. That is, the book center portion of the scanned image of the book document becomes hard to see.

In order to solve the above problem, Japanese Unexamined Patent Publication No. 62(1987)-143557 discloses a document reading apparatus which comprises a distance sensor for detecting a distance between the document table and each position of a surface of an original document, and the sub-scanning pitch is varied according to the distance between the document table and each position of the surface of the original document, so as to eliminate deformation in the sub-scanning direction and enable accurate reading of image information on the original document.

In addition, Japanese Unexamined Patent Publication No. 3(1991)-117965 discloses a document reading apparatus which comprises a document reading means arranged at a predetermined distance from an original document. The document reading apparatus detects curvature of surfaces of the original document, and corrects image data according to the detected curvature, when reproducing the image.

However, the technique of Japanese Unexamined Patent Publication No. 62(1987)-143557 has a drawback that the image reading apparatus must have the distance sensor and a mechanism for changing the sub-scanning pitch according to the distance between the document table and each position of the surface of the original document during the scanning operation. On the other hand, in the document reading apparatus of Japanese Unexamined Patent Publication No. 3(1991)-117965, the document reading means is arranged to read the original document from above, and the document reading means must be held at a predetermined distance from the original document. That is, the document reading apparatus disclosed in Japanese Unexamined Patent Publication No. 3(1991)-117965 is not a flat bed scanner. That is, the constructions of the document reading apparatuses disclosed in Japanese Unexamined Patent Publication Nos. 62(1987)-143557 and 3(1991)-117965 are different from the conventional general-purpose scanner. Therefore, the cost is considerably increased for the above special constructions.

Further, when spread (open) pages of a book document are read by a flat bed scanner, outlines of pages other than the open pages appear in the scanned image as illustrated in FIG. 2, in addition to the aforementioned darkened, deformed, and blurred image of the book center. Therefore, it is difficult to determine the edges (contour) of the open pages and the heights of the edges by the document reading apparatuses disclosed in Japanese Unexamined Patent Publications Nos. 62(1987)-143557 and 3(1991)-117965.

SUMMARY OF THE INVENTION

A first object of the present invention is to provide an image processing method and an image processing apparatus which can correct deformation, unevenness of lightness, and a blur in an image of a book center, using only low cost image processing, where the image of the book center is obtained by scanning a pair of spread (open) pages of a bound book placed on a document table.

A second object of the present invention is to provide a book-center-height obtaining unit which can obtain a plurality of heights (lifts) of a plurality of points of the book center above a document table, based on only an image of the book center, when the image of the book center is obtained by scanning a pair of spread pages of a bound book placed on a document table.

According to the first aspect of the present invention, there is-provided an image processing method which includes the steps of (a) obtaining a plurality of heights, above a document table, of a plurality of points of a pair of spread pages of a bound book as an original document, based on a contour of the pair of spread pages which appears in an image of the pair of spread pages, where the bound book is placed on the document table; and (b) correcting degradation of the image of the pair of spread pages, based on the plurality of heights obtained by the height obtaining unit.

According to the second aspect of the present invention, there is provided an image processing apparatus which contains a height obtaining unit which obtains a plurality of heights, above a document table, of a plurality of points of a pair of spread pages of a bound book as an original document, based on a contour of the pair of spread pages which appears in an image of the pair of spread pages, where the bound book is placed on the document table; and an image correcting unit which corrects degradation of the image of the pair of spread pages, based on the plurality of heights obtained by the height obtaining unit.

With the image processing apparatus according to the second aspect of the present invention, the heights of a plurality of points of the book center are obtained based on the contour of the book center in the image obtained by scanning the book center, and degradation of the image is corrected based on the heights obtained from the contour of the book center in the image. That is, the degradation of the image can be corrected based on only the image. Therefore, it is unnecessary to provide any specific sensor or additional device, or to change the construction of the conventional scanner. Thus, the degradation of the image can be corrected at low cost.

In the image processing apparatus according to the second aspect of the present invention, the above height obtaining unit may contain a reference line extracting unit which extracts at least one reference line based on a top and bottom portions of the contour of the pair of spread pages which appears in the image; a correction area determining unit which determines as a correction area an area of the image corresponding to a portion of the pair of spread pages which is lifted from the document table, based on the at least one reference line and the contour; a distance obtaining unit which obtains a distance from each pixel of a portion of the contour in at least one edge of the correction area, to the at least one reference line; an edge height obtaining unit which obtains a height of each point of a top and bottom edges of the portion of the pair of spread pages above the document table, based on the distance obtained by the distance obtaining unit; and a height distribution obtaining unit which obtains a height of each point of the portion of the pair of spread pages above the document table, based on the height of each point of the top and bottom edges of the portion of the pair of spread pages.

That is, the height of each point of the edges of the book center is obtained based on the top and bottom portions of the contour of the book center which appears in the image, and the height of each point of the book center can be obtained based on the height of each point of the edges of the book center.

In the above height obtaining unit, the at least one reference line is a straight line obtained by extending an undeformed straight portion of the contour of the pair of spread pages which appears in the image.

The height of each point of the edges of the book center can be obtained even if the spread pages in the pair are differently skewed.

When the skew angles of the spread pages in the pair are identical, it is possible to obtain the distance from each pixel of a portion of the contour in at least one edge of the correction area to only one reference line. However, when obtaining the distance based on only one reference line, it is necessary to provide a means to equalize the skew angles of the spread pages in the pair. The skew angles of the spread pages on the document table are generally different, and the skew angles are often different even between the top and bottom edges of each of the spread pages. Therefore, when the above means for equalizing the skew angles of the spread pages is not provided, it is preferable to obtain reference lines (four in total) from the top and bottom edges of the respective spread pages in the pair, to accurately obtain the heights of the respective points of the book center above the document table.

The correction area may be defined as an area encircled by the top and bottom portions of the contour of the spread pages and lines connecting top and bottom branch points of the respective spread pages, where the top and bottom branch points are points at which the corresponding reference lines branch from the top and bottom portions of the contour, respectively. In other words, the branch points are points at which the correction is commenced.

The height of each point of the edges of the book center can be obtained even if the book is placed on the document table in a slanting direction. However, when the image of the bound book is read by a line sensor, the book must be placed on the document table so that the directions of the top and bottom edges of the book are not parallel to the direction of the line sensor. Otherwise, when the image of the bound book is read by an area sensor, there is no requirement regarding the direction of the book on the document table.

In the image processing apparatus according to the second aspect of the present invention, the above image correcting unit may be a unit which corrects unevenness of lightness, deformation, or a blur of the image.

When the image correcting unit in the second aspect of the present invention corrects unevenness of lightness, the image correcting unit calculates, based on the heights of the respective points of the book center, corrected values of lightness for the respective pixels of the book center portion of the image, where the corrected values of lightness are values of lightness which the respective pixels of the book center portion of the image will have if the book center of the spread pages is in contact with the document table. Then, the image correcting unit changes the values of lightness which the respective pixels of the book center portion of the image, to the corrected values of lightness. Thus, the unevenness of lightness of the image can be corrected.

When the image correcting unit in the second aspect of the present invention corrects deformation, first, the image correcting unit obtains, by calculation based on the heights of the respective points of the book center, corrected pixel positions for the respective pixels of the book center portion of the image, where the corrected pixel positions are pixel positions at which the respective points of the book center of the spread pages will be located if the book center of the spread pages is in contact with the document table. Then, the image correcting unit moves the respective pixels of the book center portion of the image to the corrected pixel positions, and interpolated values are assigned to pixels which are vacated by the movement to the corrected pixel positions. Thus, the deformation in the book center portion can be corrected.

When the image correcting unit in the second aspect of the present invention corrects a blur in the image obtained by scanning the book, the image correcting unit corrects the blur based on the heights of the respective points of the book center, by using a blur correction filter corresponding to a height (lift) of each point of the book center, i.e., a blur correction filter which is suitable for correcting a blur caused by the height (lift) of each point of the book center.

When unevenness of lightness or a blur is corrected after deformation of the image is corrected, a value of the height for the interpolated pixel is necessary. In this case, the value of the height for the interpolated pixel can be obtained based on the heights of pixels located around the interpolated pixel. On the other hand, when deformation is corrected after unevenness of lightness and/or a blur is corrected, it is unnecessary to obtain a value of the height for the interpolated pixel.

DESCRIPTION OF THE DRAWINGS

FIG. 1 is a perspective view illustrating relative positions of a document table, a book document, and an image reading apparatus;

FIG. 4 is a diagram illustrating an example of a binarized image of a pair of spread pages of a bound book placed on a document table;

FIG. 5 is a diagram illustrating an example of a contour image of a pair of spread pages of a bound book placed on a document table;

FIG. 6a is a simplified diagram illustrating a contour of a pair of spread pages of a bound book;

FIG. 6b is an enlarged view of a book center portion of the contour of FIG. 6a;

FIG. 11 is a diagram illustrating an example of a lift of the book center portion of the spread pages of the book document 3, and the movements of the respective points of the book center to the corrected positions on the document table 2;

FIG. 12 is a diagram illustrating a way of obtaining the corrected point $q_n$ on the reference line;

FIG. 15 is a diagram illustrating the fore edge portions of the image of the book document 3.

DESCRIPTION OF PREFERRED EMBODIMENTS

An image processing apparatus as an embodiment of the present invention is explained below with reference to the drawings.

The image processing apparatus as an embodiment of the present invention obtains a distance from a document table to each point of a book center portion of a pair of spread pages of a bound book placed on the document table, and corrects deformation, unevenness of lightness, and a blur of an image of the bound book, based on the distance.

Figure 3:
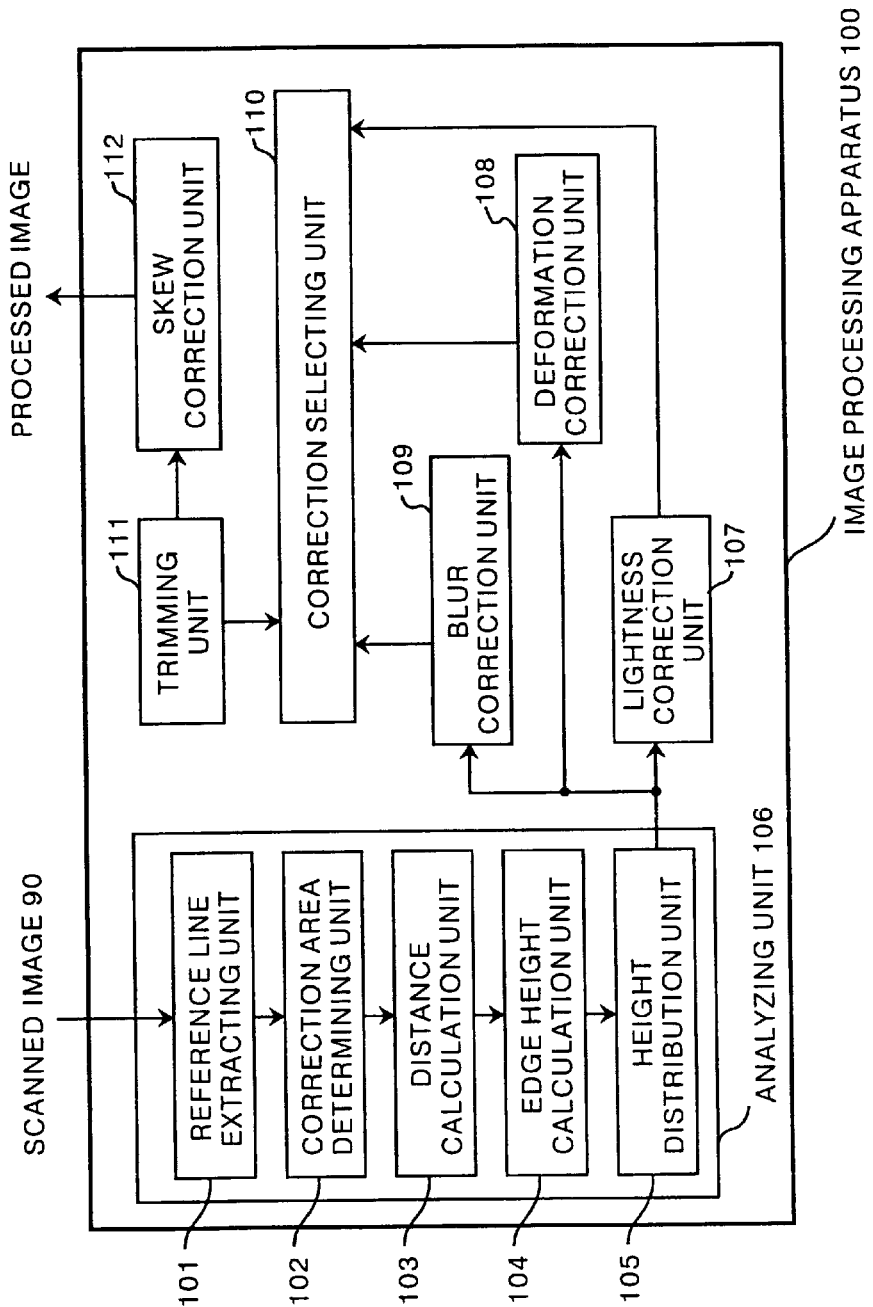
FIG. 3 is a block diagram illustrating the construction of the image processing apparatus as the embodiment of the present invention.

FIG. 3 is a block diagram illustrating the construction of the image processing apparatus as the embodiment of the present invention. As illustrated in FIG. 3, the image processing apparatus 100 as the embodiment of the present invention contains an analyzing unit 106 including a reference line extracting unit 101, a correction area determining unit 102, a distance calculation unit 103, an edge height calculation unit 104 and a height distribution calculation unit 105. A lightness correction unit 107, a deformation correction unit 108 and a blur correction unit 109 are connected to the height distribution calculation unit 105. The lightness correction unit 107, the deformation correction unit 108 and the blur correction unit 109 are connected to a correction selecting unit 110, which is connected with a trimming unit 111 that is connected to a skew correction unit 112.

The analyzing unit 106 corresponds to the aforementioned height obtaining unit in the image processing apparatus according to the second aspect of the present invention. The analyzing unit 106 contains the reference line extracting unit 101, the correction area determining unit 102, the distance calculation unit 103, the edge height calculation unit 104, and the height distribution calculation unit 105, which correspond to the reference line extracting unit, the correction area determining unit, the distance obtaining unit, the edge height obtaining unit, and the height distribution obtaining unit, respectively. That is, the analyzing unit 106 obtains a plurality of heights, above the document table, of a plurality of points of the pair of spread pages of the bound book, based on a contour of the pair of spread pages which appears in the image of the book.

Based on the height (distance) of each point of the book center portion above the document table, the lightness correction unit 107 corrects unevenness of lightness in the image of the book, the deformation correction unit 108 corrects deformation of the image, and the blur correction unit 109 corrects a blur in the image. The correction selecting unit 110 performs necessary correction of degradation of the image by selectively using the lightness correction unit 107, the deformation correction unit 108, and the blur correction unit 109. The trimming unit 111 trims off unnecessary portions of the image. The skew correction unit 112 corrects the skew of the image.

Explanations of the respective elements in the construction of FIG. 3 are provided below.

[1] First, explanations on the reference line extracting unit 101 are provided below.

FIG. 1 shows a scene of scanning of a bound book by a flat bed scanner. In FIG. 1, the bound book 3 is placed on a document table 2 of the flat bed scanner as an image reading apparatus 4. In FIG. 1, the main scanning direction, the sub-scanning direction, and the direction of the lift from the document table 2 are indicated by x, y, and z coordinates, respectively. Considering the aforementioned case in which the skew angles of the top and bottom portions of the contour of the pair of spread pages are different, four reference lines 11, 12, 13, and 14 (as illustrated in FIG. 4) are extracted by the reference line extracting unit 101 in this embodiment.

Figure 2:
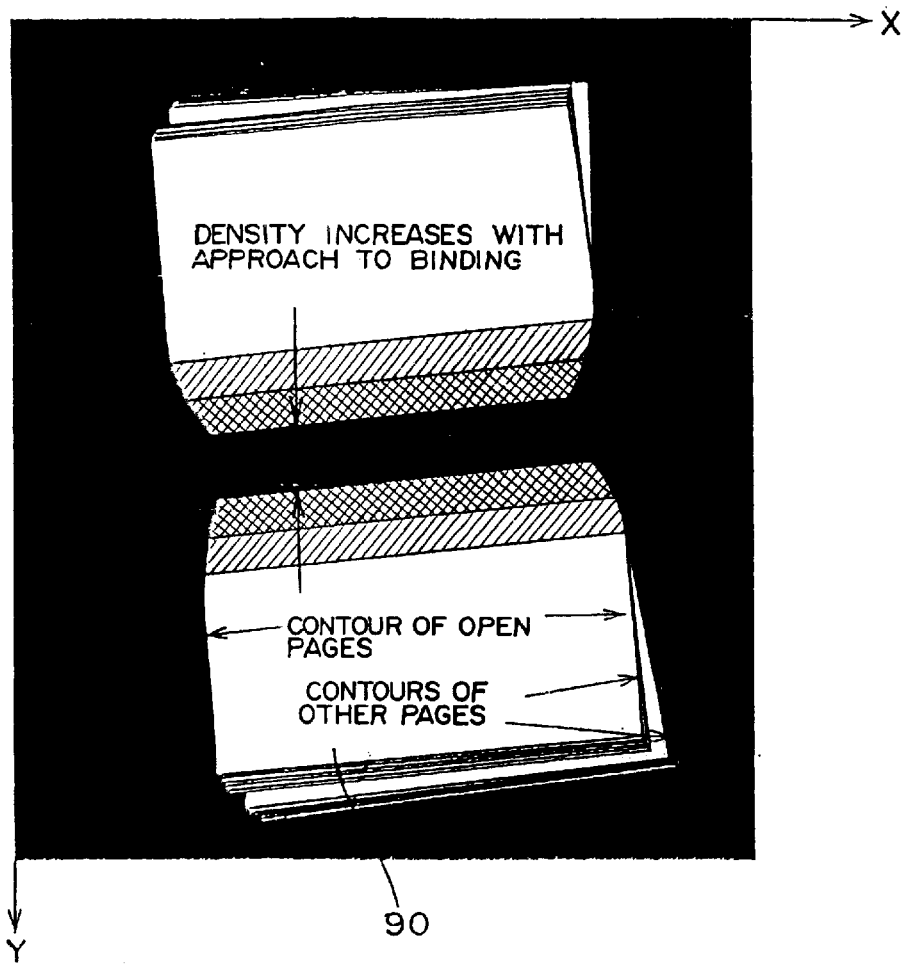
FIG. 2 is a diagram illustrating an example of an image obtained by scanning a pair of spread pages of a bound book placed on a document table.

The image reading apparatus 4 contains a reduction optical system, and obtains density of each pixel of the image of the pair of spread pages in the form of digital value of n bits (e.g. 8 bits). In this embodiment, the digital value 255 corresponds to the pure white level, and the digital value 0 corresponds to the pure black level. Since, as illustrated in FIG. 2, the density of each point of the book center portion increases with the lift of the point, the digital value representing the density of each point of the book center portion decreases with the lift of the point.

When an average density value in areas of the above image corresponding to portions of the spread pages which are in contact with the document table 2 is obtained, and the entire image is binarized based on the average density value, the binarized image as illustrated in FIG. 4 is obtained. In the binarized image of FIG. 4, the areas 91 corresponding to the portions of the spread pages which are in contact with the document table 2 are white, and all of the other areas are black. Next, almost straight portions of the top and bottom sides of the contours the areas 91 are respectively extended to obtain four straight lines as the aforementioned four reference lines 11 to 14. In order to determine the straight lines, any known technique for detecting a straight line, such as the Hough transformation, boundary tracing, and the method of least squares, may be used.

[2] Explanations on the correction area determining unit 102 are provided below.

FIG. 5 is a diagram illustrating an example of a contour image of a pair of spread pages of a bound book placed on a document table. Since a book center portion of a scanned image such as the image of FIG. 2 is darker than the aforementioned portions of the spread pages which are in contact with the document table 2, it is impossible to extract contours of the book center portion of the spread pages from the binarized image such as the image of FIG. 4. Therefore, the contour image of FIG. 5 is obtained by averaging the book center portion of a scanned image such as the image of FIG. 2, and then binarizing the averaged image. Thus, the contours of the book center portion of the spread pages can be extracted as illustrated in FIG. 5.

In FIG. 5, the points 21, 22, 23, and 24, at which the reference lines 11, 12, 13, and 14 branch from the top and bottom portions of the contour of the spread pages, are hereinafter called correction start points. Then, an area encircled by a straight line connecting the correction start points 21 and 23, a straight line connecting the correction start points 22 and 24, a portion of the contour of the spread pages between the correction start points 21 and 22, and a portion of the contour of the spread pages between the correction start points 23 and 24 is defined as a correction area 50.

In addition, the points at which the contour is recessed most deeply are defined as book center points 31 and 32, a line connecting the book center points 31 and 32 is defined as a parting line 41, and the area of FIG. 5 is divided by the parting line 41 into an upper area 61 and a lower area 62.

[3] Explanations on the distance calculation unit 103 are provided below.

FIG. 6a is a simplified diagram illustrating a contour of a pair of spread pages of a bound book, and FIG. 6b is an enlarged view of a book center portion of the contour of FIG. 6a. In FIG. 6b, $L_n$ (n=1, 2, ...) each denote a distance from each point of the contour 10 of the spread pages to one of the reference lines 11 to 14. The distance $L_n$ is obtained for each pixel of a book center portion of the contour 10. In this case, for example, distances $L_n$ and $L_{n-1}$ from two adjacent pixels to the reference line may become identical due to a quantization error. However, since the height changes gradually in the book center portion, a more accurate value of the distance $L_n$ can be obtained by interpolation between the distances $L_{n-1}$ and $L_{n+1}$.

[4] Explanations on the edge height calculation unit 104 are provided below.

Figure 7:
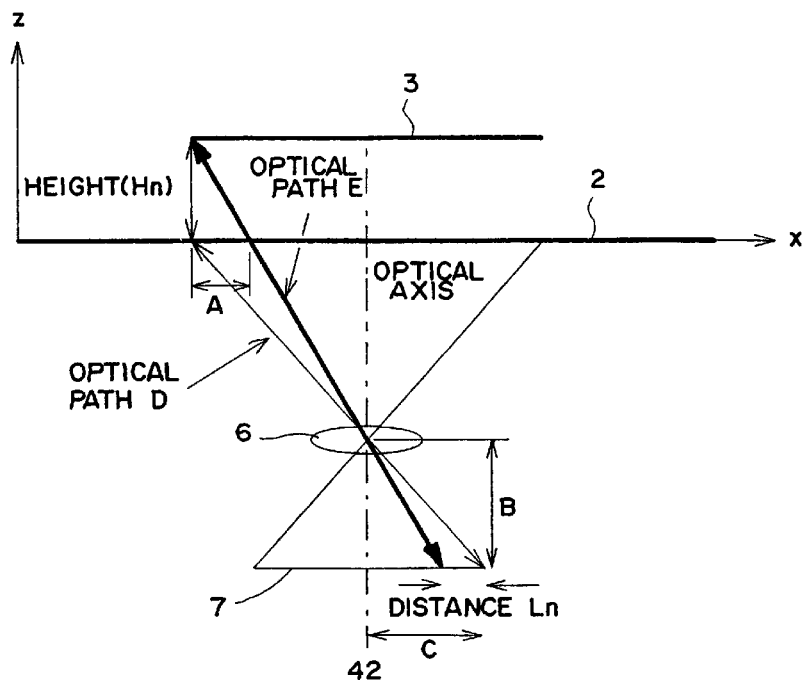
FIG. 7 is a diagram illustrating a geometrical relationship among a book document, a lens, and an image-forming plane.

FIG. 7 shows a geometrical relationship among a book document 3, a document table 2, a lens 6, and an image-forming plane 7. For example, when the book document 3 is not lifted from the document table 2, an image of a left edge of the book document is formed by light through the optical path D. Otherwise, when the book document 3 is lifted to the height $H_n$ above the document table 2, the image of the left edge of the book document is formed by light through the optical path E. In this case, there is a relationship between the height $H_n$ of each point of the left edge of the book document above the document table 2 and the aforementioned distance $L_n$ from each pixel of the contour to the reference line, as expressed by the following equation (1).

$$H_n = B \times A/(C-L_n) \tag{1}$$

where $H_n$ (n=1, 2, ...) is the height of a point of an edge of the book document 3 above the document table 2, A is a distance between the point at which the optical path D intersects with the document table 2 and the point at which the optical path E intersects with the document table 2, B is a distance between the lens 6 and the image-forming surface (light-receiving surface) 7, C is a distance from the optical axis 42 to one of the reference lines 11 to 14, and $L_n$ is the distance from each point of the contour 10 of the spread pages to the reference line. Thus, the height $H_n$ can be obtained from the distance $L_n$.

[5] Explanations on the height distribution calculation unit 105 are provided below.

The height distribution calculation unit 105 obtains by interpolation a height $H_{in}'$ (n=1, 2, ...) of each point of the spread pages above the document table 2, based on the heights $H_n$ (n=1, 2, ...) of the respective points of the edges of the spread pages above the document table 2.

Figure 8:
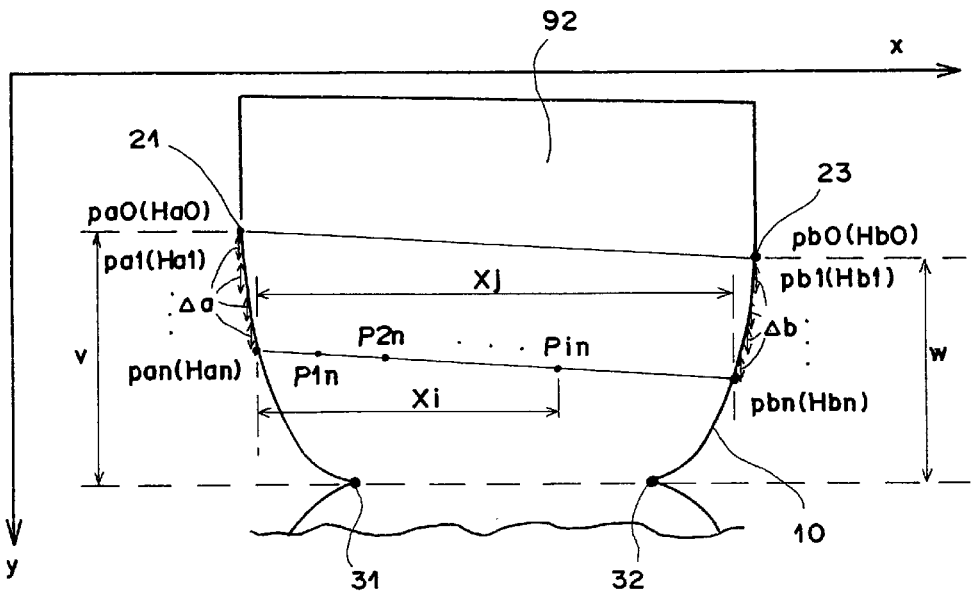
FIG. 8 is a diagram illustrating the upper area of a contour image of the spread pages for explaining the operation of the height distribution calculation unit 105.

Since the image of the spread pages is divided by the parting line 41 into the upper area 61 and the lower area 62, the following explanations are provided only on the upper area 61 with reference to FIG. 8, which shows the upper area of a contour image of the spread pages.

A plurality of points $p_{an}$ (n=0, 1, 2, ...) ranging from the correction start point 21 ($p_{a0}$) are defined on the left portion of the contour so that the plurality of points $p_{an}$ have y coordinates at intervals of $\Delta a$, and a plurality of points $p_{bn}$ (n=0, 1, 2, ...) ranging from the correction start point 23 ($p_{b0}$) are defined on the right portion of the contour so that the plurality of points $p_{bn}$ have y coordinates at intervals of $\Delta b$. When the difference between the y coordinates of the correction start point 21 and the book center point 31 is denoted by v, and the difference between the y coordinates of the correction start point 23 and the book center point 32 is denoted by w, $\Delta a$ and $\Delta b$ are set as follows.

$\Delta a=1$ and $\Delta b=w/v$ when $w<v$, $\Delta a=v/w$ and $\Delta b=1$ when $v<w$, and $\Delta a=\Delta b=1$ when $v=w$.

For each value of n, the points $p_{an}$ and $p_{bn}$ are connected by a straight line, and the height $H_{in}'$ of a point of the spread pages (of the book document 3) corresponding to each pixel $p_{in}$ (i=0, 1, 2, ...) located an the straight line is obtained by one-dimensional interpolation between the height $H_{an}$ of the point $p_{an}$ and the height $H_{bn}$ of the point $p_{bn}$. That is, the height $H_{in}'$ can be obtained by the following equation (2).

$$H_{in}' = H_{an} + (H_{bn}-H_{an}) \times x_i/x_j \tag{2}$$

where $x_j$ is the difference between the x coordinates of the points $p_{an}$ and $p_{bn}$ and $x_i$ is the difference between the x coordinates of the points $p_{an}$ and $p_{in}$, Furthermore, the accurate value of $H_{in}'$ can be obtained by the following equation (2)'

$$Hin' = Han + (Hbn - Han) \times \frac{\sqrt{xi^2 + yi^2}}{\sqrt{xj^2 + yj^2}} \tag{2'}$$

where $y_j$ the difference between the y coordinates of the points $p_{an}$ and $p_{bn}$, and $y_i$ is the difference between the y coordinates of the points $p_{an}$ and $p_{in}$.

Thus, the analyzing unit 106 obtains a plurality of heights, above the document table, of a plurality of points of the pair of spread pages of the bound book, based on the contour of the pair of spread pages which appears in the image of the book.

[6] Explanations on the lightness correction unit 107 are provided below.

Figure 9:
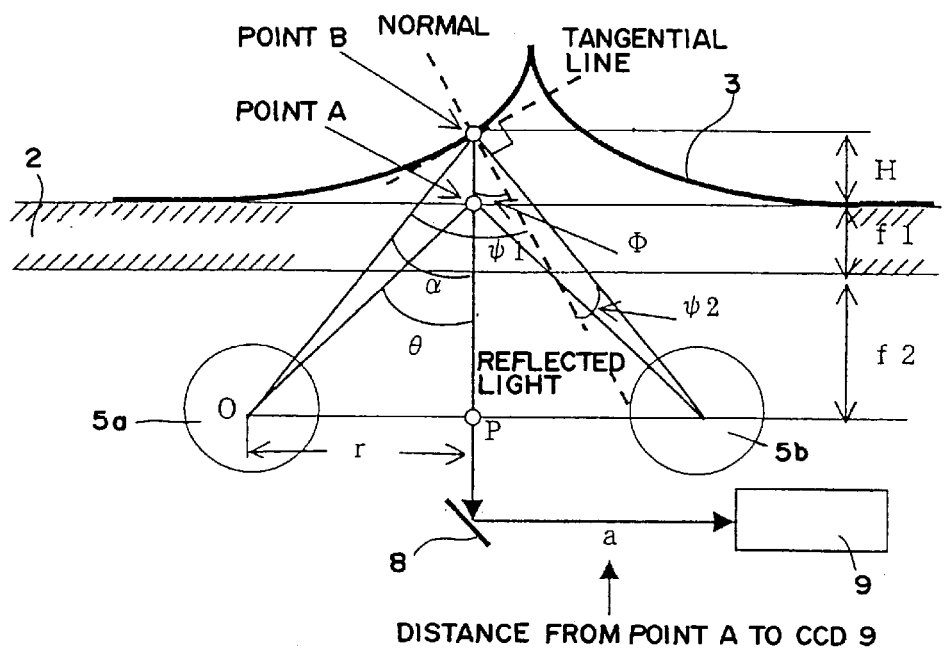
FIG. 9 is a side view illustrating a geometrical relationship among the spread pages of the book document 3, the document table 2, light sources 5a and 5b, a mirror 8, and a charge-coupled device (CCD) 9 in the flat bed scanner.

FIG. 9 is a side view illustrating a geometrical relationship among the spread pages of the book document 3, the document table 2, light sources 5a and 5b, a mirror 8, and a charge coupled device (CCD) 9 in the flat bed scanner. In the configuration of FIG. 9, the surfaces of the spread pages of the book document 3 are illuminated by light from the light sources 5a and 5b, and the light reflected by the point B on the surfaces of the spread pages of the book document 3 is lead through the point A on the document table 2 and is reflected by the mirror 8 to the charge coupled device (CCD) 9. In order to obtain a value of corrected lightness at the point A, intensities of the incident light and the reflection light at the points A and B are necessary, and can be obtained as follows.

The intensities of the incident light at the points A and B are inversely proportional to the identical distance from the light sources 5a and 5b to the points A and B, respectively.

That is, the intensity $I_A$ of the incident light at the points A is expressed as $$I_A \propto 1 \Big/ \sqrt{\left(\frac{f1}{n} + f2\right)^2 + r^2} \quad (3)$$

and the intensity $I_B$ of the incident light at the points B is expressed as $$I_B \propto 1 \Big/ \sqrt{\left(\frac{f1}{n} + f2 + H\right)^2 + r^2} \quad (4)$$

where f1 is the thickness of the document table 2, f2 is the distance from the centers of the light sources 5a and 5b to the document table 2, n is the refraction index of the glass of the document table 2, r is the distance from the centers of the light sources 5a and 5b to the midpoint P between the centers of the light sources 5a and 5b, and H is the distance from the point B to the document table 2.

The intensities of the reflection light at the points A and B can be obtained by the following equations (5) and (6), respectively.

That is, the intensity $R_A$ of the reflection light at the points A is expressed as $$R_A = I_A \times \rho \times 2\cos\theta, \quad (5)$$

and the intensity $R_B$ of the reflection light at the points B is expressed as $$R_B = I_B \times \rho \times (\cos\psi1 + \cos\psi2), \quad (6)$$

where $\rho$ is the reflectance of the paper of the book document 3, $\theta$ is the angle at the point A between the incident light from the light source 5a and the reflection light, $\psi1$ is the angle at the point B between the incident light from the light source 5a and the normal to the surface, and $\psi2$ is the angle at the point B between the incident light from the light source 5b and the normal to the surface.

As illustrated in FIG. 9, $\cos\theta$ is determined according to the positions of the light sources 5a and 5b, and can be obtained by the following equation (7).

$$\cos\theta = (f1 + f2) \Big/ \sqrt{\{r^2 + (f1 + f2)^2\}} \quad (7)$$

In addition, as illustrated in FIG. 9, $\psi1$ and $\psi2$ are expressed as $$\psi1 = \alpha + \Phi, \quad (8)$$

and $$\psi2 = \alpha - \Phi. \quad (9)$$

Further, the angle a is obtained by the following equation (10).

$$\alpha = \arctan(r/(f1+f2+H)) \quad (10)$$

Figure 10:
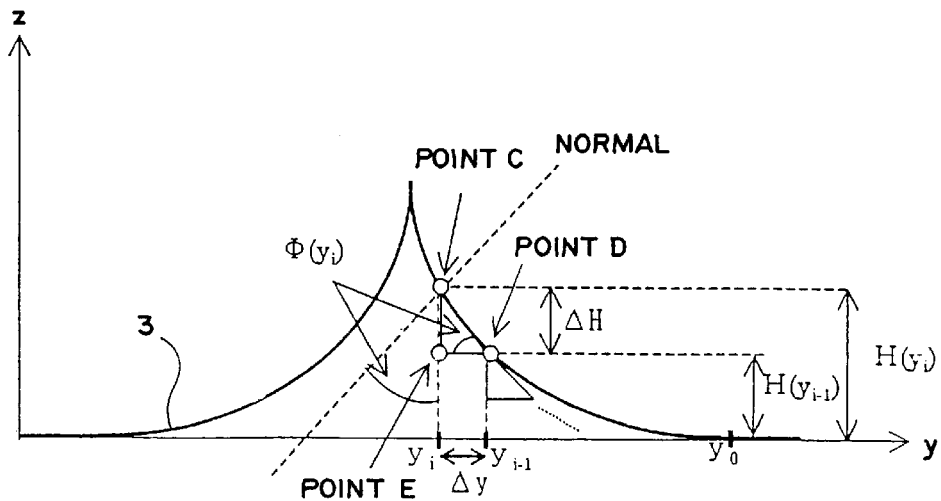
FIG. 10 is a diagram illustrating a relationship between the angle $\Phi(y_i)$ and the height of each point of the surfaces of the spread pages of the book document 3.

The angle $\Phi$ is obtained as follows. FIG. 10 shows a relationship between the angle $\Phi$ and the height of each point on the surfaces of the spread pages of the book document 3.

As illustrated in FIG. 10, the height $H(y_i)$ of an arbitrary point C of the surfaces of the spread pages of the book document 3 can be obtained as an accumulation of $\tan(\Phi(y_i))\Delta y$ in the section from the $y_0$ coordinate $y_0$ of one of the correction start points 21 to 24 to the y coordinate $y_i$ of the point C. That is, $$H(y_i) = \sum_{j=0}^{i} \tan(\Phi(y_j)) \times \Delta y \quad (11)$$

$$= \sum_{j=0}^{i-1} \tan(\Phi(y_j)) \times \Delta y + \tan(\Phi(y_i)) \times \Delta y$$

$$= H(y_{i-1}) + \tan(\Phi(y_i)) \times \Delta y.$$

Since processing is performed on a digital image, $\Delta y$ can be assumed to be one, i.e., $\Delta y = 1$, and therefore $\Phi(y_i)$ can be obtained as $$\Phi(y_i) = \arctan(H(y_i) - H(y_{i-1})). \quad (12)$$

Since the reflection light received by a light receiving element can be deemed to be a ray from a point light source, the reflection density value at the point A is expressed as $$D_A \propto R_A / a^2, \quad (13)$$

and the reflection density value at the point B is expressed as $$D_B \propto R_B / (a+H)^2, \quad (14)$$

where a is a traveling length of the reflection light from the point A to the charge coupled device (CCD) 9.

Since the proportionality constants in the relationships (13) and (14) are the same, the following equation can be obtained from the relationships (13) and (14).

$$D_A = D_B \times (a+H)^2 / a^2 \times R_A / R_B \quad (15)$$

Based on the equations (5) and (6), the equation (15) can be rewritten as follows.

$$D_A = D_B \times (a+H)^2 / a^2 \times 2$$

$$\times \cos\theta / (\cos\psi1 + \cos\psi2) \times I_A / I_B \quad (16)$$

Then, based on the equations (3), (4), and (16), the reflection density value $D_A$ of the point A can be obtained by the following equation (17).

$$D_A = D_B \times 2 \times \cos\theta / (\cos\psi1 + \cos\psi2)$$

$$D_A = D_B \times 2 \times \cos\theta / (\cos\psi1 + \cos\psi2) \times \quad (17)$$

$$\frac{(a+H)^2}{a^2} \times \frac{\sqrt{\left(\frac{f1}{n} + f2 + H\right)^2 + r^2}}{\sqrt{\left(\frac{f1}{n} + f2\right)^2 + r^2}}$$

Therefore, the lightness at the point A can be obtained by substituting the aforementioned height $H_n$ or $H_{in}'$ for H in the equation (17). Thus, the lightness at the point B can be corrected to the lightness at the point A.

[7] Explanations on the blur correction unit 109 are provided below.

The blur in the book center image is caused by the lift of the book center portion of the spread pages from the document table 2. That is, due to the lift of the book center portion, the book center portion is located beyond the depth of field of the reduction optical system, and therefore a blur occurs. The degrees of blurs at the respective points of the book center image are different according to the lifts of the corresponding points of the book center portion of the spread pages. Therefore, the blur correction unit 109 corrects the blurs of the book center image by varying the amount of correction according to the degrees of the blurs.

The degree of a blur is proportional to the height of each point of the book center portion. Therefore, image correction processing is performed by using a Laplacean operator so that the amount of correction varies with the of high frequency enhancement processing using a digital Laplacean operator. In the equation (18), f(i,j) indicates an image before correction, and g(i,j) indicates an image after correction.

$$g(i,j)=f(i,j)-\nabla^2 f(i,j) \tag{18}$$

However, in this embodiment, a function of high frequency enhancement processing as expressed in the following equation (19) is used, where the digital Laplacean operator is weighted.

$$g(i,j)=f(i,j)-\gamma(H)\times\nabla^2 f(i,j) \tag{19}$$

The weight $\gamma$ (H) in the equation (19) is a function which is proportional to the height H. Therefore, when the height H increases, the weight $\gamma$ also increases.

Thus, when substituting the aforementioned height $H_n$ or $H_{in}'$ for H in the equation (19), correction of the blur can be performed so that the amount of the correction varies with the height H.

[8] Explanations on the deformation correction unit 108 are provided below.

The image correcting unit 108 obtains, by calculation based on the heights of the plurality of points of the book center portion, corrected pixel positions for the respective pixels of the book center portion of the image obtained by scanning the book document 3 placed on the document table 2, where the corrected pixel positions are imaginary pixel positions at which the respective points of the book center of the spread pages will be located if the book center portion of the spread pages is in contact with the document table 2. Then, the image correcting unit 108 moves the respective pixels of the book center portion of the image to the corrected pixel positions, and interpolated values are assigned to pixels which are vacated by the movement to the corrected pixel positions. FIG. 11 shows an example of a lift of the book center portion of the spread pages of the book document 3, and the movements of the respective points of the book center portion to the corrected positions on the document table 2752.

First, explanations on correction of deformation in edges of the correction area corresponding to the edges of the book center portion are provided below.

It is assumed that, in the correction of deformation, a plurality of points $r_n$ (n=1, 2, ... ) on one of the edges of the book center move to a plurality of corrected points $q_n$ (n=1, 2, ... ) on one of the reference lines. The heights $H_n$ of the plurality of points $r_n$ (n=1, 2, ... ) can be obtained by the equation (1) based on the respective distances $L_n$ (n=1, 2, ... ) from the reference line to a plurality of points of the contour corresponding to the plurality of points $r_n$ (n=1, 2, ... ).

The corrected point $q_n$ on the reference line is determined as follows. FIG. 12 is provided for explaining a way of determining the corrected point $q_n$ on the reference line. In FIG. 12, the y' axis corresponds to the reference line.

As illustrated in FIG. 12, the y' coordinate of the corrected point $q_n$ is determined by obtaining the correction amount k in the y' direction, i.e., in the direction of the reference line. In order to obtain the correction amount k, first, the distances $s_1, s_2, \ldots s_n$ between adjacent points among the plurality of points $r_n$ (n=1, 2, ... ) on one of the edges of the book center portion are obtained. Then, the increments $t_1, t_2, \ldots t_n$ of the y' coordinate respectively corresponding to the distances $s_1, s_2, \ldots s_n$ are obtained, as illustrated in FIG. 12. At this time, the distance $s_1$ between the correction start point $q_0$ and the adjacent point $r_1$ is obtained by the following equation (20).

$$s_1=\sqrt{(t_1^2+H_1^2)} \tag{20}$$

In addition, the distance $s_n$ between the point $r_{n-1}$ and the adjacent point $r_n$ is obtained by the following equation (21).

$$s_n=\sqrt{(t_n^2+(H_n-H_{n-1})^2)} \tag{21}$$

Since the sum $(s_1+s_2+ \ldots +s_n)$ is approximately equal to the sum $(t_1+t_2+ \ldots +t_n+k)$, the above correction amount k can be determined by the following equation (22).

$$k=(s_1+s_2+ \ldots +s_n)-(t_1+t_2+ \ldots +t_n) \tag{22}$$

Thus, the y' coordinate of the corrected point $q_n$ is determined.

Although accuracy of correction is decreased, it is possible to obtain the correction amount k based on the distance u between the correction start point $q_0$ and the point $r_n$ instead of the sum $(s_1+s_2+ \ldots +s_n)$, for simplifying calculation. That is, $$k=u-(t_1+t_2+ \ldots +t_n). \tag{23}$$

As described above, a plurality of corrected points $q_n$ (n=1, 2, ... ) on each of the reference lines can be determined, and the deformation in the edges of the correction area corresponding to the edges of the book center portion can be corrected by moving the pixels in the original image to the corrected points $q_n$ (n=1, 2, ... ).

Next, explanations on operations of correcting deformation of an image by moving pixels inside the edges of the correction area are provided below.

Referring to FIG. 5, the aforementioned upper area 61 is divided by the optical axis 42 into the left area 71 and the right area 73, and the lower area 62 is divided by the optical axis 42 into the left area 72 and the right area 74, where the optical axis 42 is an optical axis of the reduction optical system in the scanner unit as illustrated in FIG. 7.

In order to correct the positions of the pixels inside the edges of the correction area, it is necessary to obtain a reference line for each pixel. After the reference line is obtained, a corrected pixel position is obtained, and the pixel is moved to the corrected position, in a similar manner to the correction of deformation in the edges of the correction area. For example, in the example of FIG. 13, a corrected pixel position $q_n'$ corresponding to an uncorrected pixel position $p_n$ in the area 71 (in FIG. 5) is obtained as follows.

Figure 13:
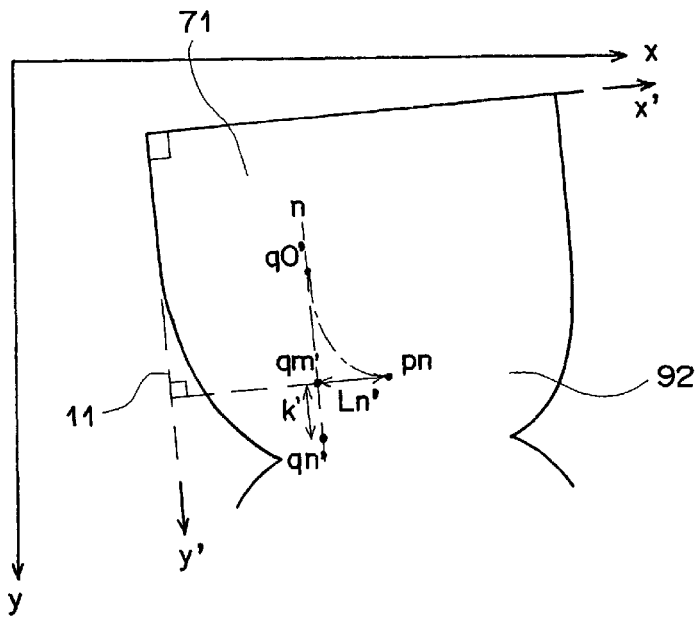
FIG. 13 is an enlarged view of the area 71 in FIG. 5.

FIG. 13 is an enlarged view of the area 71 in FIG. 5. In FIG. 13, the y' axis corresponds to the reference line 11, and the x' axis is in the direction perpendicular to the y' axis. First, a point $q_m'$, which is located at a distance of $L_n'$ from the uncorrected pixel position $p_n$ in the direction perpendicular to the reference line 11, is obtained. The distance $L_n'$ can be obtained from the relationship of the equation (1). In this case, the height $H_{in}'$ of the point $p_n$ is obtained from the equation (2), and is substituted for $H_n$ in the equation (1). In addition, the distance from the point $p_n$ to the optical axis 42 is obtained, and is substituted for the value (C-Ln) in the equation (1). The reference line n for the point $p_n$ is obtained as a straight line which passes through the above point $q_m'$ and is parallel with the reference line 11. Then, a correction amount k' (which is similar to the correction amount k in FIG. 12) can be obtained by using the equations (20) to (22). Therefore, the point $q_n'$, which is located at the distance k' from the point $q_m'$ on the reference line n, is obtained as the above corrected pixel position for the uncorrected pixel position $p_n$. Thus, the pixel at the point $p_n$ in the deformed image is moved to the point $q_n'$ in a corrected image.

Due to the above movement, some pixels in the corrected image may be vacated. Values (densities) which are to be assigned to the vacated pixels are determined by interpolation. The interpolation is performed in each of the areas 71 to 74 in FIG. 5 since the above movement of pixels in each of the areas 71 to 74 is performed based on one of the reference lines 11 to 14 corresponding to the area, and the distribution of the vacated pixels has the same directionality as the reference line corresponding to the area. Therefore, a density value which is to be assigned to a vacated pixel is determined by interpolation between unvacated pixels existing in the direction of the reference line.

Figure 14:
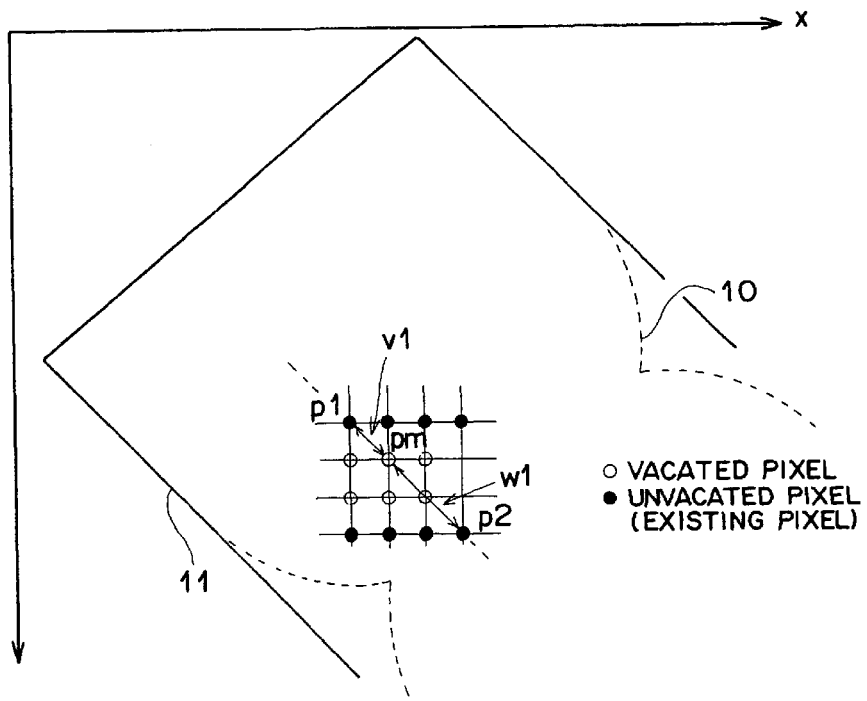
FIG. 14 is a diagram illustrating an example of distribution of vacated and unvacated pixels in an image generated by the pixel movement in the area 71.

FIG. 14 shows an example of distribution of vacated and unvacated pixels in an image generated by the pixel movement for correction of deformation in the area 71. For example, a density value to be assigned to a vacated pixel $p_m$ in FIG. 14 can be obtained as follows.

First, an unvacated pixel near the vacated pixel $p_m$ is searched for in the direction of the reference line 11. When the unvacated pixel is searched for in the direction in which the y' coordinate increases, the unvacated pixel $p_2$ is found. On the other hand, when the unvacated pixel is searched for in the direction in which the y' coordinate decreases, the unvacated pixel $p_1$ is found. When it is assumed that the densities of the unvacated pixels $p_1$ and $p_2$ are respectively d1 and d2, the distance from the pixel $p_m$ to the pixel $p_1$ is v1, and the distance from the pixel $p_m$ to the pixel $p_2$ is w1, the density value to be assigned to the pixel $p_m$ is determined by the following equation (24).

$$dm = d1 \times w1/(v1+w1) + d2 \times v1/(v1+w1) \quad (24)$$

When the deformation of the image is corrected as above, the image of the book center portion is extended. Therefore, in order to prevent overlap of the extended images of the spread pages, the extended images of the spread pages are relatively moved in the sub-scanning (y) direction. The amount of the relative movement of the extended images of the spread pages in the y direction is obtained based on the maximum amount of the movement of the pixels in the operation of correcting the deformation, i.e., the amount of movement of the book center points 31 and 32.

[9] Explanations on the trimming unit 111 are provided below.

The trimming unit 111 detects and trims off the fore edge portions of the image of the book document 3. FIG. 15 shows the fore edge portions of the image of the book document 3. The trimming unit 111 trims off the fore edge portions by extracting only an image of an innermost pair of pages (corresponding to the spread pages) in the image of the book document 3, as explained below.

First, the image of the fore edge portions is binarized by using the high frequency enhancement processing. Then, the binarized image is divided into a plurality of areas, and it is determined whether or not a straight line exists in each of the plurality of areas. Since edges of the respective pages of the book document appear as a straight line in some areas which overlap the fore edge portions, the trimming unit 111 recognizes that the image of the desired pair of spread pages extends inside the innermost areas in which a straight line appears, and extracts only a region inside the innermost areas as the image of the desired pair of spread pages. In order to detect a straight line, the Hough transformation, boundary tracing, the method of least squares, or the like may be used.

[10] Other Matters

The book document 3 may be placed on the document table 2 in a slanting direction. Therefore, the image of the book document 3 may be skewed. Further, skew angles of the right and left pages may be different. In such cases, the appearance of an output image is deteriorated. Therefore, skew correction processing is performed by the skew correction unit 112. Even if the skew angles of the right and left pages are different, the skew correction unit 112 can obtain the skew angles based on the reference lines 11 to 14. The skew of the image of each page can be independently corrected by rotation processing such as the Affine transformation.

As described above, in the above embodiment, correction of degradation of an image can be performed by only image processing, where the image is an image of a pair of spread pages of a book document 3 placed on a document table 2, and obtained by an image reading device having a reduction optical system. The degradation of the image may include unevenness of lightness, deformation, a blur, or the like, and occurs in a book center image. The correction is performed by only image processing, based on heights $H_n$ or $H_{in}'$ of a plurality of points of the book center image.

Although, in the described embodiment, the operation of detecting the heights of the respective points of the book center portion is incorporated in the operation of correcting the degradation of the image, the operation of obtaining the heights per se can be used separately.

All of the contents of the Japanese Patent Application No. 11(1999)-44965 are incorporated into this specification by reference.

What is claimed is:

1. An image processing apparatus comprising:

an image scanning unit which scans an original document on a document table and obtains a scanned image of the original document, a height obtaining unit which utilizes data from the scanned image to obtain a plurality of heights of a plurality of points of a pair of spread pages of the original document, based on a contour of the pair of spread pages which appears in the scanned image of the pair of spread pages obtained by the image scanning unit; and an image correcting unit which corrects degradation of the image of the pair of spread pages, based on the plurality of heights obtained by the height obtaining unit, wherein said height obtaining unit comprises, a reference line extracting unit which extracts at least one reference line based on a top and bottom portions of the contour of the pair of spread pages which appears in the image, a correction area determining unit which determines as a correction area an area of the image corresponding to a portion of the pair of spread pages which is lifted from the document table, based on said at least one reference line and said contour, a distance obtaining unit which obtains a distance from each pixel of a portion of said contour in at least one edge of said correction area, to said at least one reference line, an edge height obtaining unit which obtains a height of each point of a top and bottom edges of said portion of the pair of spread pages above the document table, based on said distance obtained by the distance obtaining unit, and a height distribution obtaining unit which obtains a height of each point of said portion of the pair of spread pages above the document table, based on said height of each point of said top and bottom edges of said portion of the pair of spread pages.

2. An image processing apparatus according to claim 1, wherein said image correcting unit comprises a lightness correcting unit which corrects unevenness of lightness of said image.

3. An image processing apparatus according to claim 1, wherein said image correcting unit comprises a deformation correcting unit which corrects deformation of said image.

4. An image processing apparatus according to claim 1, wherein said image correcting unit comprises a blur correcting unit which corrects a blur of said image.

5. An image processing method comprising the steps of:

(a) scanning an original document on a document table and obtaining a scanned image of the original document, (b) utilizing data of the scanned original image to determine a plurality of heights of a plurality of points of a pair of spread pages of the original document; and (c) correcting degradation of the image of the pair of spread pages, based on the plurality of heights obtained in step (b), wherein the step of correcting degradation comprises utilizing a reference line extracting unit which extracts at least one reference line based on a top and bottom portions of the contour of the pair of spread pages which appears in the image, a correction area determining unit which determines as a correction area an area of the image corresponding to a portion of the pair of spread pages which is lifted from the document table, based on said at least one reference line and said contour, a distance obtaining unit which obtains a distance from each pixel of a portion of said contour in at least one edge of said correction area, to said at least one reference line, an edge height obtaining unit which obtains a height of each point of a top and bottom edges of said portion of the pair of spread pages above the document table, based on said distance obtained by the distance obtaining unit, and a height distribution obtaining unit which obtains a height of each point of said portion of the pair of spread pages above the document table, based on said height of each point of said top and bottom edges of said portion of the pair of spread pages.

* * * * *